United States Patent [19]

Ratcliff

[11] 3,863,170

[45] Jan. 28, 1975

[54] THERMALLY STABLE POWER AMPLIFIER

[75] Inventor: Henry Kevin Ratcliff, Wirral, England

[73] Assignee: The Bendix Corporation, South Bend, Ind.

[22] Filed: Feb. 21, 1973

[21] Appl. No.: 334,517

[52] U.S. Cl. .................... 330/23, 307/263, 307/268, 330/21, 330/26, 330/31

[51] Int. Cl. .............................................. H03f 1/32

[58] Field of Search ........... 307/261, 263, 268, 280; 328/22, 223; 330/21, 23, 26, 28, 31, 196; 331/113 R, 165, 166

[56] References Cited

UNITED STATES PATENTS 3,363,116 1/1968 Kan ................................ 307/280 X 3,648,188 3/1972 Ratcliff ................................ 330/26

*Primary Examiner*—Alfred E. Smith

*Assistant Examiner*—Lawrence J. Dahl

*Attorney, Agent, or Firm*—Leo H. McCormick, Jr.; William N. Antonis

[57] ABSTRACT

An alternating current amplifier includes a first transistor for controlling an operational signal derived from an input signal and a voltage to develop a sinusoidal output signal upon passing through a load. A second transistor is connected to the first transistor and the input signal for controlling the interval of time during which the input signal and voltage are communicated to the first transistor to reduce their simultaneous presence therein and prevent thermal energy from being created which would materially affect the operation of the first transistor.

8 Claims, 7 Drawing Figures

Patented Jan. 28, 1975 3,863,170

2 Sheets-Sheet 2

THERMALLY STABLE POWER AMPLIFIER

BACKGROUND OF THE INVENTION

Transistors which are operated in a switching mode are normally driven into saturation for a more efficient operation. Saturation occurs when an input signal does not provide any increase in an output signal. In normal switching modes, a collector current follows the base current input in response to a square wave or trigger to cause saturation as quickly as possible. A maximum collector current will be obtained with the lowest possible value of saturation resistance. However, with an increase in temperature, the saturation resistance is correspondingly increased exponentially. Most of the temperature increases are caused by fall-time or turn-off losses. The current fall time $I_{sw}$ in slow and inexpensive transistors will overlap the rising edge of the voltage waveform $V_{sw}$ when high voltage and current are presented to the transistors. The simultaneous presence of current $I_{sw}$ and voltage $V_{sw}$ in the transistor will cause heat to be generated therein. The heat generated in the transistor by the high instantaneous power dissipation of several hundred watts will cause changes in the shape of the current waveform. The usual shape change will result in the falling edge being delayed, to introduce a " foot" or "kink" upon approaching zero current in the transistor. This "foot" or "kink" increases the time of simultaneous presence of voltage and current in the transistor and can be measured as the area of a triangle. This area is directly proportional to the thermal energy expanded in the transistor per cycle of operation. The creation of this thermal energy must be avoided to prevent thermal runaway in the transistor.

The most common solutions to avoid thermal runaway has been to mount the transistors on large heat sinks and circulate air around the transistor to carry away sufficient thermal energy to permit most normal operations. However, over an extended period of time, thermal runaway is still possible when the heat absorption characteristics are exceeded.

In my earlier U.S. Pat. No. 3,648,188, incorporated herein by reference, I taught how an alternating current could be amplified through a switching transistor. This switching transistor was sequentially presented with voltage and current to produce an operational signal for driving a load. This power amplifier device performs adequately with heat sinking and does not exhibit the thermal runaway characteristics when operating in ambient condition wherein the temperature is below 75°F. However, when the ambient temperature is above 75°F., a possible thermal runaway condition could develop.

SUMMARY OF THE INVENTION

I have designed a power amplifier apparatus wherein, through a circuit modification, the fall time losses are stabilized at a level below that which could damage the operation of a switching transistor means. The switching transistor means are capable of operation with high voltages but possess the undesirable characteristics of being slow to switch off at high currents. To compensate for this, I propose that a low voltage transistor operate as a control means by being connected to the emitter side of the switching transistor means to instantaneously switch off current in response to a common input signal. By speeding up the fall time of the current by the control means, the current reaches a low level before the voltage across the transistor has time to rise significantly. The shape of the waveform of the voltage is fixed by constants in the circuit. Circuit constants are selected to return the voltage to zero before the current is permitted to rise. Thus, the simultaneous presence of voltage and current in the switching transistor is regulated by the control transistor. Because the reduction in time of response of the first transistor to the input signal is reduced to a time interval less than that which will create detrimental thermal energy, the operational power amplifier can be operated in a stabilized mode in most environments.

It is therefore the object of this invention to provide a means of regulating fall time in a switching means through a circuit control means.

It is another object of this invention to provide a power amplifier apparatus with a transistor switching means having an emitter connected to a control transistor means for reducing the creation of thermal energy in the transistor switching means caused by the presence of voltage and current therein.

It is another object of this invention to provide a power amplifier apparatus with a first transistor means for establishing an operational signal with a high gain from an operating condition and a second transistor means for controlling the operational condition to maintain a stable operational signal over an extended period of time.

DETAILED DESCRIPTION OF THE PREFERRED EMBODIMENT

Figure 1:
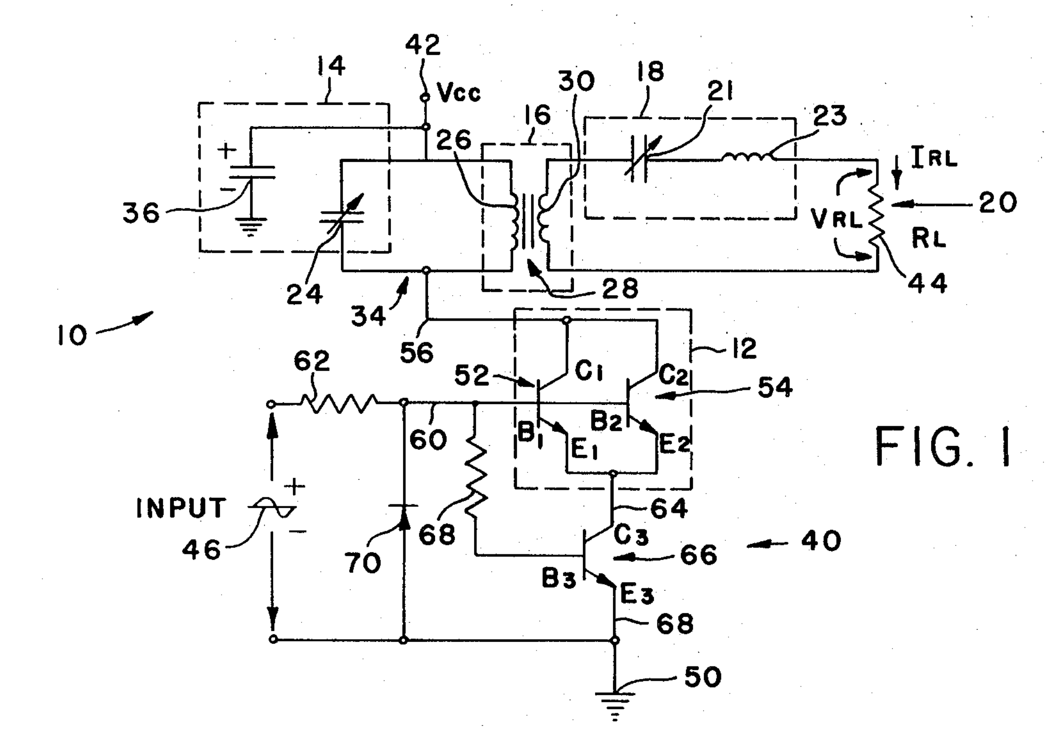
FIG. 1 is a schematic of a power amplifier circuit having a control means for reducing the creation of thermal energy in a transistor switching means.
Figure 3:
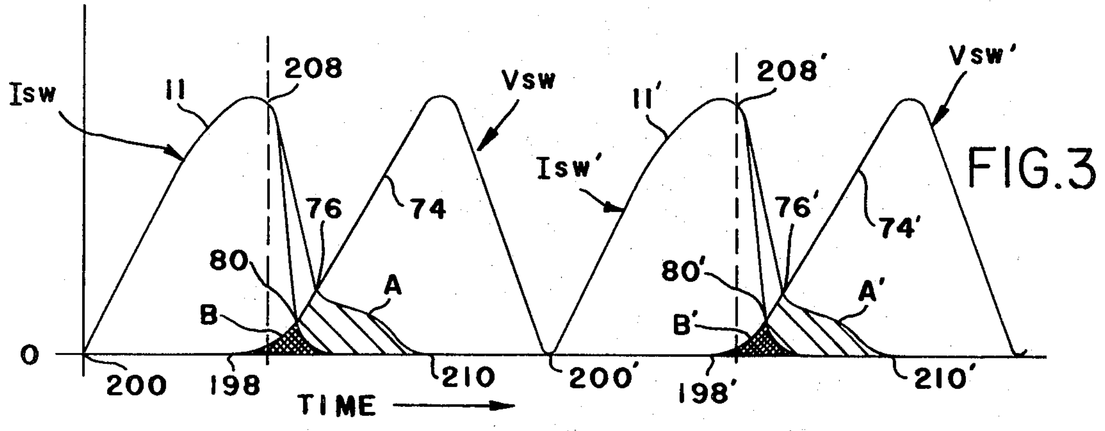
FIG. 3 is a graphic illustration of a laboratory measurement of current and voltage presented to a switching transistor during a cyclic period of time.

The schematic in FIG. 1 illustrates the components necessary to develop a transistorized power amplifier 10 for driving a load 20 at a desired stabilized frequency over an extended period of time without thermal runaway. The stabilized frequency from the power amplifier is maintained because the collector voltage $V_{sw}$ appearing across the switching transistor means 12 and the collector current $I_{sw}$ are made to form alternate half-cycles or pulses as shown in FIG. 3. $V_{sw}$ and $I_{sw}$, when present in the switching transistor means, will create thermal energy typically shown by the area bounded by cross hatching A in FIG. 3. This occurs because of the time required to switch the transistor means 12 off.

Figure 2:
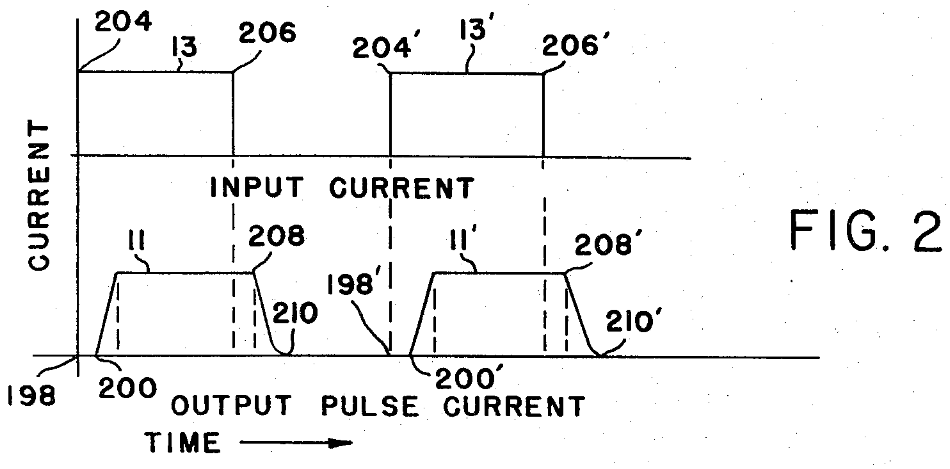
FIG. 2 is a graphic illustration comparing input current to output current during a corresponding time period.

Switching transistors are usually constructed to have four distinct time measurements relating to the output current, line 11, to the input current, line 13, pulses, see FIG. 2. The input current 13 is sequentially controlled by the positive half of the alternating cycle of the current supply 46. There is a delay time, $t_d$, represented by point 198 and 200, from the time the input current is transformed into output current because of the internal resistance of the switching transistor means 12. From the time the transistor switching means 12 begins to conduct, at point 200 a time period $t_r$ or rise time will lapse before full conductance is reached at point 202. The input current 13 remains on for a period of time equal to $t_i$, the interval between point 204 and 206 in FIG. 2. Because of the composition of the transistor switching means 12, storage interval $t_s$, represented by the time interval between point 206 and 208, is larger than the delay interval $t_d$, the output current pulse is wider than the input current pulse. Further because of the physical characteristics of the transistor switching means 12, the fall time, $t_f$, shown as between points 208 and 210 in FIGS. 2 and 3 represents decay in transistor switching means 12 from the On to Off condition. This fall time $t_f$ is the period of time when both current $I_{sw}$ and voltage $V_{sw}$ can appear in the switching transistor means 12 to generate thermal energy and disrupt the operational characteristics thereof. However, when a control means 40 is connected to regulate the presentation of the input signal to the transistor means 12, the switching fall time $t_f$ is reduced and the creation of thermal energy in switching is reduced to that shown by the shaded area B in FIG. 3.

During the period when the switching transistor means 12 is turned on or in a conducting mode, part of the energy derived from the current pulse is stored in the shaping circuit 14 with the remainder being transmitted to the load $R_L$ or 20 through a matching circuit 16. During the period when the switching transistor means 12 is turned off or in a nonconducting mode, voltage from a source 42 is communicated to the switching transistor means 12 and the energy stored in the shaping circuit 14 applied through the matching means 16 to energize a series resonant circuit 18 to develop a sinusoidal voltage across the resistor 44 of the load means 20.

In more particular detail, the series resonant circuit 18 has an adjustable capacitor 21 and an inductor 23 which is charged when the switching transistor means 12 is conducting. The shaping circuit 14 is connected to a supply capacitor 36 which helps provide a constant voltage with the supply voltage $V_{cc}$ 42 due to peak demands experienced during switching, and a variable capacitor 24 for providing recovery in the primary winding 26 of transformer 28 in the matching circuit 16. The variable capacitor 24 is adjustable to ensure that $V_{sw}$ is at zero at point 200; 200'; 200'' . . . during each cycle of operation, see FIG. 3, before $I_{sw}$ starts to rise.

A secondary winding 30 of the transformer 28 is connected to the load 20 through the series resonant circuit 18. The series resonant circuit 18 is charged by the transformer 28. Each time the switching means 12 is closed, transformer 28 couples energy into the adjustable capacitor 21 of the resonant circuit 18 to create a positive half sinusoid of current to flow through the load resistor 44.

The primary circuit 34 includes the primary winding 26 of the transformer 28, the recovery capacitor 24, the switching transistor means 12, a direct current supply 42, a supply capacitor 36, and an alternating current supply 46. When the switching transistor means 12 is closed, no change occurs to the voltage appearing in the variable capacitor 24. The upper plate of the variable capacitor 24 is directly connected to the positive terminal of the supply voltage source 42 while the lower plate is connected to ground 50 through the switching transistor means 12. The current which flows through the primary winding 26 consists of a positive half sinusoid of current related to the transformer turns ratio to the current $I_{RL}$ flowing in the secondary and negative half sinusoid of current flow developed by discharging the series circuit 18 upon opening of the switching transistor means 12, as stated in my prior U.S. Pat. No. 3,648,188 incorporated herein by reference.

The switching transistor means 12 includes a first transistor 52 having a first collector $C_1$ connected to the voltage source 42 through lead 56 coming from the primary winding 26 and a second transistor 54 having a second collector $C_2$ connected to lead 56 in parallel to the first collector $C_1$. A common lead 60 modified by a resistor 62 simultaneously transmits an input signal to the first base $B_1$ of the first transistor 52 and the second base $B_2$ of the second transistor 54. A lead 64 connects the first emitter $E_1$ of transistor 52 and the second emitter $E_2$ of transistor 54 to the control means 40. FIG. 1 shows two transistors 52 and 54 as the switching transistor means 12. However, a single transistor with twice the current capabilities should work equally as well but currently costs more than twice as much to produce.

The control means 40 includes a third transistor 66 having a third collector $C_3$ adapted to receive the output from the emitters $E_1$ and $E_2$ through lead 64. The base $B_3$ is connected through resistor 68 to the common lead 60 and will simultaneously receive the input signal from the source 46 with bases $B_1$ and $B_2$. The emitter $E_3$ of the third transistor 64 is connected through lead 68 to the ground 50. A diode 70 circuit is connected between lead 68 to lead 60.

The diode circuit 70 will provide a return path for the input signal to complement or provide symmetry to the base emitter junction path of the transistors 52, 54 and 66. Without the diode circuit 70, the input signal 46 would fluctuate causing a distortion in the uniformity of the input or drive signal. The negative half of the input signal 46 will flow through the diode circuit 70 to change the charge stored within it. The magnitude of the charge is directly proportional to the magnitude of the input current, with a "slower" diode storing a corresponding larger charge. This stored charge will speed up the operation of the transistor switching means 12 since the diode circuit 70 will act as an infinite capacitor during the time period that the positive half cycle of the input signal 46 is communicated to the bases $B_1$ and $B_2$. This short circuit will remain until the stored charge in the diode circuit 70 is exhausted, at which time the input current will have reached a high value causing the current into the base $B_1$ and $B_2$ of the transistor switching means 12 to have a vertical face 222, see FIG. 5. This sharp pulse $t_p$ (the time period between points 200 and 212) will switch transistors 52 and 54 on "fast" and being narrower than the half sinusoid, it compensates for the storage time $t_s$, see FIG. 2.

Figure 5:
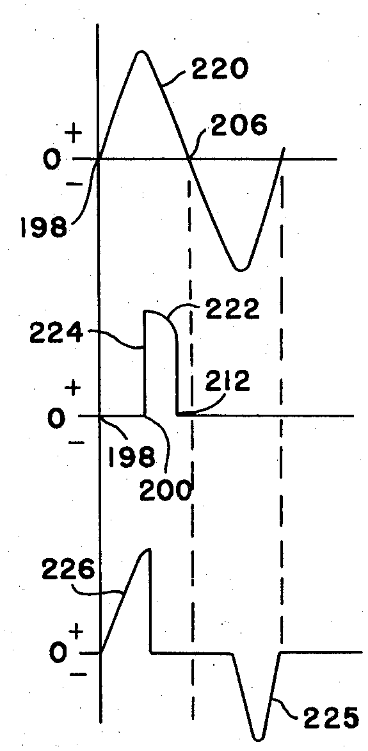
FIG. 5 is a graphic illustration of the current presented to an operational diode control means in the transistor switching means in FIG. 5.
Figure 4:
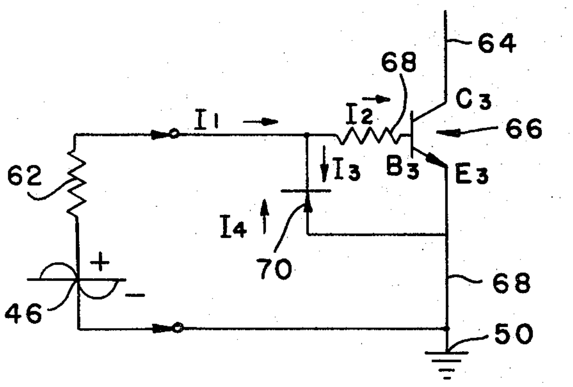
FIG. 4 is a schematic of the current flow in a control transistor and diode control means.

As shown in FIG. 4, the input current $I_1$ into the transistor switching means 12 and diode circuit 70 will obey the following know conservation of electrical energy equation:

$$I_1 = I_2 + I_3 + I_4$$

where $I_1$ = total current supplied and graphically illustrated by line 220 in FIG. 5

$I_2$ = current pulse into the base $B_1$, $B_2$ and $B_3$ of the transistors 52, 54 and 66 illustrated by line 222 in FIG. 5

$I_3$ = current stored in diode 70 during the positive half cycle illustrated by line 226 in FIG. 5; and $I_4$ = discharge of the diode 70 during the negative half cycle illustrated by line 228 in FIG. 5

Thus, by choosing the speed of the diode 70, the shape of the input current pulse can be regulated to ensure a fast "turn on" response from the switching transistor means 12 and compensate for the storage time $t_s$ resulting in the delay time between point 198 to 200 required to turn the transistors on. Through this diode 70, a high charge can be maintained on the transistors while they are turned off and as a result, can become emitters much faster when turned on.

MODE OF OPERATION OF THE PREFERRED EMBODIMENT

Figure 6:
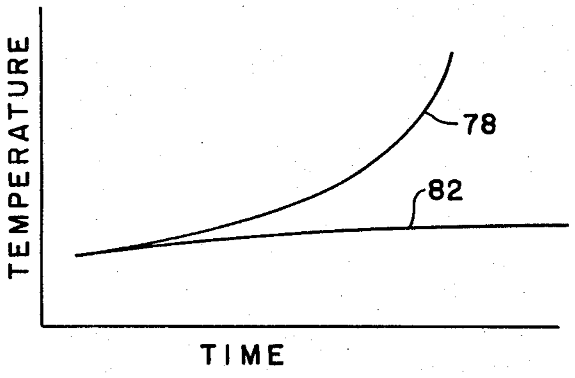
FIG. 6 is a graphic illustration showing the creation of thermal energy with respect to time in the transistor switching means.

To establish a comparison for determining the effect of the control means 40, I initially connected lead 64 from emitters $E_1$ to $E_2$ to the ground 50. Alternating current from source 46 supplies an input signal to cyclically switch transistors 52 and 54 from a conducting to a non-conducting mode. During the positive half of the alternating current cycle, $I_{su}$ will be present in the transistors 52 and 54 as represented by line 11. The transistors 52 and 54 are high voltage elements, typically 100 watt DTS-430, which can withstand high voltages of the order of 700 volts but unfortunately are slow to switch off at high current. During the negative half of the alternating current cycle, $V_{su}$ as representative by line 74 will be present from source 42 in the transistors 52 and 54. Because of the slowness of the complete dissipation of $I_{su}$ and $V_{su}$ in the transistors, thermal energy, as represented by the loss triangle A, will be created. The base of the loss triangle $t_2$ the time interval between 198 and 210 was measured to be 6 microseconds with 150 volts across the transistor and 3 AMP flowing through it at the apex 76 to produce a loss of 450 watts peak during each cycle through the creation of thermal energy. This instantaneous 450 watt loss over a period of time will cause the temperature to follow a curve similar to line 78 in FIG. 6. As the creation of thermal energy progresses, a corresponding reduction in the output from the transistors will be experienced.

I then added the control means 40 to the switching means 12 to evaluate my improvement. The transistor 66 of the control means 40 is interposed between the emitters $E_1$ and $E_2$ and ground 50, while the input signal from the alternating source 46 is attached to $B_3$ for simultaneous reception with $B_1$ and $B_2$ of transistors 52 and 54. Transistor 66 is a low voltage element with a high current rating, such as DTS-103, which is a 15 Amp - 100 volt device. Since the voltage across transistor 66 should never exceed 5 volts, fast switching will result. Now during the transistion from $I_{su}$ to $V_{su}$ in the switch, the loss triangle is reduced to B, see FIG. 3. The base of the loss triangle B is now 1.5 microseconds and the height at the apex 80 is 50 volts and 1 Amp with a resulting peak power loss of 50 watts.

A reduction to only about 1/9 the losses from thermal energy creation is achieved and with minimum heat sinking the further creation of thermal energy will be stabilized as shown by line 82, see FIG. 4. Thus, the possibility of thermal runaway has been reduced to a compatable level in the operation of a stable power amplifier.

Figure 7:
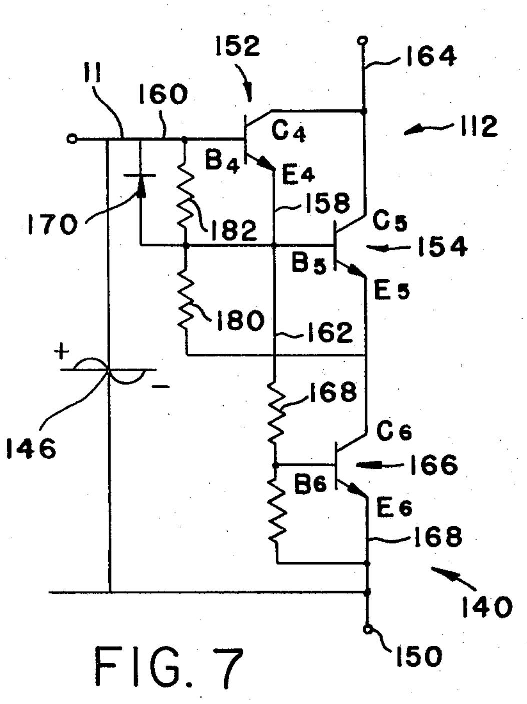
FIG. 7 is another embodiment of a control means for a transistor switching means in a power amplifier circuit.

In the embodiment shown in FIG. 7 wherein like parts are numbered with 100 added to the numeral of FIG. 1, the switching transistor means 112 includes a first transistor 152 and a second transistor 154 and the control means 140 includes a third transistor 166 for regulating the development of the operational control signal to provide a sinusoidal output for the load 20.

The first transistor 152 has a collector $C_4$ connected to the common lead 64 coming from the transformer 126, a base $B_4$ connected to lead 160 for receiving the input signal from the alternating current source 146, and an emitter $E_4$ connected through lead 162 to ground 150.

The second transistor 154 has a collector $C_5$ connected to the common lead 164, for dividing the voltage from source 142 with transistor 152 during the non-conducting mode, a base $B_5$ connected to lead line 158 for receiving the output from emitter $E_4$ during the conducting mode and an emitter $E_5$ connected to the control means 140. The base $B_5$ is connected to diode 170 which will minimize the storage time in the driven transistor 154.

The stored charge in transistor 154 will flow from the emitter $E_5$ out through resistor 180 with diode 170. Otherwise it would have to go through resistor 182 connected between base $B_5$ and the input 160 which would increase the time taken to remove the charge when the transistor means 112 is switched off.

The third transistor 166 has a collector $C_6$ connected to the emitter $E_5$ for regulating the switching of the power transistor 154, a base $B_6$ for receiving the output from emitter $E_4$ as modified by resistor 168, and an emitter $E_6$ connected to ground 150.

As in the embodiment of FIG. 1, the switching transistor means 112 is adapted to receive high voltage while the transistor 166 of the control means will be adapted to receive low voltage. Thus, it is possible to have a high gain since the driver transistor 152 initially boosts the input signal and the power transistor 152 provides further gain to develop the operational output signal while the control transistor 166 will switcn on and off rapidly to reduce the fall time $t_f$ similar to the reduction shown in FIG. 3.

Thus, I have provided a power amplifier means 10 with a switching means 12 wherein the creation of thermal energy is subdued by reducing the time both current and voltage are present therein by a fast operating control.

I claim:

1. A transistor power amplifier comprising:

switching means connected between a voltage source and a ground for controlling an operational signal derived from an input signal supplied by a source of electrical current;

shaping means located between said switching means and said voltage source for sequentially presenting said input signal and said voltage to said switching means;

resonant means connected to said switching means for transmitting said operational signal at a predetermined frequency to a load;

matching means connected to said resonant means and said voltage source for isolating the input signal from the operational signal to develop a sinusoidal output signal upon passing the operational signal through said load; and control means connected to said switching means and said ground for preventing the creation of thermal energy in the switching means by substantially eliminating the instantaneous and simultaneous presence of the input signal and voltage source therein to thereby stabilize the frequency of said operational signal over an extended period of time.

2. The transistor power amplifier, as recited in claim 1, wherein said switching means includes:

a first transistor having a first base connected to receive said input signal, a first collector connected to receive said voltage source, and a first emitter connected to the ground; and a second transistor having a second base connected to receive said input signal simultaneously with said first base, a second collector connected to receive said voltage source, and a second emitter connected to the ground, said first and second collectors dividing the electrical potential from said voltage source to reduce the overall development time of said operational signal.

3. The transistor power amplifier, as recited in claim 2, wherein said control means includes:

a third transistor having a third base connected to receive said input signal simultaneously with said first and second bases of the first and second transistors respectively, a second collector connected to said first and second emitters for receiving the output therefrom, and a third emitter connected to the ground, said third transistor reacting to said input signal faster than said first and second transistors to limit the simultaneous presence of said input means and said voltage in the first and second transistors to less than 2 microseconds.

4. The transistor power amplifier, as recited in claim 3, wherein said control means further includes:

a diode shunting means located between the third transistor and ground for providing a balanced load on the input signal and for shaping the input signal to prevent a distorted output from the transistor switching means resulting in time delays caused during the derivation of the operational signal from the input signal.

5. The transistor power amplifier, as recited in claim 4, wherein said first and second transistors are high voltage devices capable of developing a high gain to produce the operational signal and said third transistor in a low voltage device capable for controlling fall time to prevent the creation of thermal energy in said first and second transistors.

6. The transistor power amplifiers, as recited in claim 1, wherein said switching means includes:

a first transistor having a first base connected to receive said input signal, a first collector connected to receive said voltage source, and a first emitter connected to the ground; and a second transistor having a second base connected to said first emitter, a second collector connected to said voltage source and a second emitter connected to said control means, said first transistor driving said second transistor to produce said operational signal.

7. The transistor power amplifier, as recited in claim 6, wherein said control means includes:

a third transistor having a third base connected to said first emitter, a third collector connected to said second emitter, and a third emitter connected to ground, said third transistor controlling the time said input signal and said voltage are present in said first and second transistors to reduce the creation of thermal energy in said first and second transistors.

8. The transistor power amplifier, as recited in claim 7, wherein said control means further includes:

a diode shunting means located between the third transistor and ground for providing a balanced load on the input signal and for shaping the input signal to prevent a distorted output from the transistor switching means resulting in time delays caused during the derivation of the operational signal from the input signal.

* * * * *